United States Patent
Zhang et al.

(10) Patent No.: US 8,849,573 B2
(45) Date of Patent: Sep. 30, 2014

(54) METHOD AND APPARATUS FOR NEUTRON POROSITY MEASUREMENT USING A NEURAL NETWORK

(75) Inventors: Qianmei Zhang, Katy, TX (US); Constantyn Chalitsios, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 408 days.

(21) Appl. No.: 13/037,758

(22) Filed: Mar. 1, 2011

(65) Prior Publication Data
US 2011/0224906 A1    Sep. 15, 2011

Related U.S. Application Data

(60) Provisional application No. 61/314,035, filed on Mar. 15, 2010.

(51) Int. Cl.
*G01V 5/04* (2006.01)
*G06F 19/00* (2011.01)
*G01V 5/12* (2006.01)

(52) U.S. Cl.
CPC *G01V 5/125* (2013.01); *G01V 5/04* (2013.01); Y10S 706/929 (2013.01)
USPC ............................ 702/8; 706/929; 250/269.4

(58) Field of Classification Search
CPC ............ G01V 5/04; G01V 5/12; G01V 5/10; G01V 5/14; G06F 19/00; E21B 2041/0028; E21B 2043/00
USPC ....................... 702/8, 11; 706/929; 250/269.4
See application file for complete search history.

(56) References Cited

U.S. PATENT DOCUMENTS

| | | | |
|---|---|---|---|
| 4,137,450 A | 1/1979 | Hopkinson | |
| 5,278,758 A | 1/1994 | Perry et al. | |
| 5,536,938 A * | 7/1996 | Mills et al. | 250/269.4 |
| 5,862,513 A | 1/1999 | Mezzatesta et al. | |
| 6,150,655 A | 11/2000 | Odom et al. | |
| 7,205,535 B2 | 4/2007 | Madigan et al. | |
| 7,548,817 B2 * | 6/2009 | Hassan et al. | 702/9 |
| 2004/0055745 A1 | 3/2004 | Georgi et al. | |
| 2007/0144740 A1 | 6/2007 | Guo et al. | |
| 2007/0246649 A1 | 10/2007 | Jacobi et al. | |
| 2009/0125239 A1 | 5/2009 | Niemeyer et al. | |
| 2009/0292473 A1 | 11/2009 | Kruspe et al. | |
| 2011/0108325 A1 | 5/2011 | Hartmann et al. | |
| 2011/0137566 A1 * | 6/2011 | Jacobson et al. | 702/8 |

FOREIGN PATENT DOCUMENTS

WO    2010024802 A1    3/2010

* cited by examiner

*Primary Examiner* — John Breene
*Assistant Examiner* — Ruihua Zhang
(74) *Attorney, Agent, or Firm* — Mossman Kumar & Tyler PC

(57) ABSTRACT

A method of estimating formation porosity using a neural network for neutron porosity tools. In the training stage, the near-to-far ratio, environmental variables, such as mineralogy, borehole size, standoff etc., are fed to the inputs and the neural network is trained for obtaining the related true porosity (the output). The trained neural network is implanted into tool's firmware for the real time porosity measurement, accounting for the environmental effects considered during training.

15 Claims, 5 Drawing Sheets

METHOD AND APPARATUS FOR NEUTRON POROSITY MEASUREMENT USING A NEURAL NETWORK

CROSS-REFERENCES TO RELATED APPLICATIONS

This application claims priority from U.S. Provisional Patent Application Ser. No. 61/314,035 filed on Mar. 15, 2010.

BACKGROUND OF THE DISCLOSURE

1. Field of the Disclosure

This disclosure relates to a method and apparatus of the logging of earth boreholes and particularly to method and apparatus for providing an indication of the earth formation porosity that is substantially independent of environmental factors such as mineralogy, borehole size, tool standoff, salinity, temperature, pressure etc.

2. The Related Art

It is well known in the prior art to utilize a neutron source and a pair of spaced radiation detectors to provide an indication of the formation porosity. With such prior art devices, the neutron source can be either a chemical source (such as an Am—Be source) or a pulsed neutron generator. The detectors can be either thermal neutron detectors or epithermal neutron detectors. Generally, it is the ratio of the count rates from the near and far detectors (the near-to-far ratio) that is indicative of the formation porosity. However, it is well-know that environmental factors, such as mineralogy, borehole size, tool standoff, tool standoff, salinity, temperature, pressure in borehole and formation etc., can affect the ratio and therefore the porosity measurement. U.S. Pat. No. 4,137,450 to Hopkinson teaches the use of different gates for providing an improved estimate of formation porosity in the presence of formation salinity when a pulsed neutron source is used. Other environmental effects, such as mineralogy, tool standoff and borehole size, etc. have not been addressed. The present disclosure teaches a method and apparatus of obtaining an improved estimate of formation porosity in real time while drilling that simultaneously accounts for these environmental factors. The method and apparatus are also capable of dealing with other environmental factors. Similar techniques can also be used in the formation density measurement to account for the environmental factors.

SUMMARY OF THE DISCLOSURE

One embodiment of the disclosure is a method of evaluating an earth formation. The method includes: using a sensor conveyed in a borehole to make a measurement indicative of a property of the earth formation; using additional sensors for making additional measurements indicative of environmental factors affecting the measurement made by the sensor; using a trained neural network (NN) for estimating a value of the property of the formation by simultaneously using the measurement and the additional measurements; and performing further operations using the estimated value of the property.

Another embodiment of the disclosure is an apparatus configured to evaluate an earth formation. The apparatus includes: a sensor configured to be conveyed in a borehole and make a measurement indicative of a property of the earth formation; a plurality of additional sensors configured to make additional measurements indicative of environmental factors affecting the measurement made by the sensor; a trained neural net (NN) configured to estimate a value of the property of the formation by simultaneously using the measurement and the additional measurements; and a processor configured to perform further operations using the estimated value of the property.

BRIEF DESCRIPTION OF THE DRAWINGS

For a detailed understanding of the present disclosure, reference should be made to the following detailed description, taken in conjunction with the accompanying drawing.

DETAILED DESCRIPTION OF THE DISCLOSURE

The teachings of the present disclosure can be applied in a number of arrangements to generally improve the estimation of formation porosity during drilling by using measurements of a number of different environmental variables during drilling. Some of the environmental measurements may be made during drilling while for other environmental variable, a priori measurements may be used.

Figure 1:
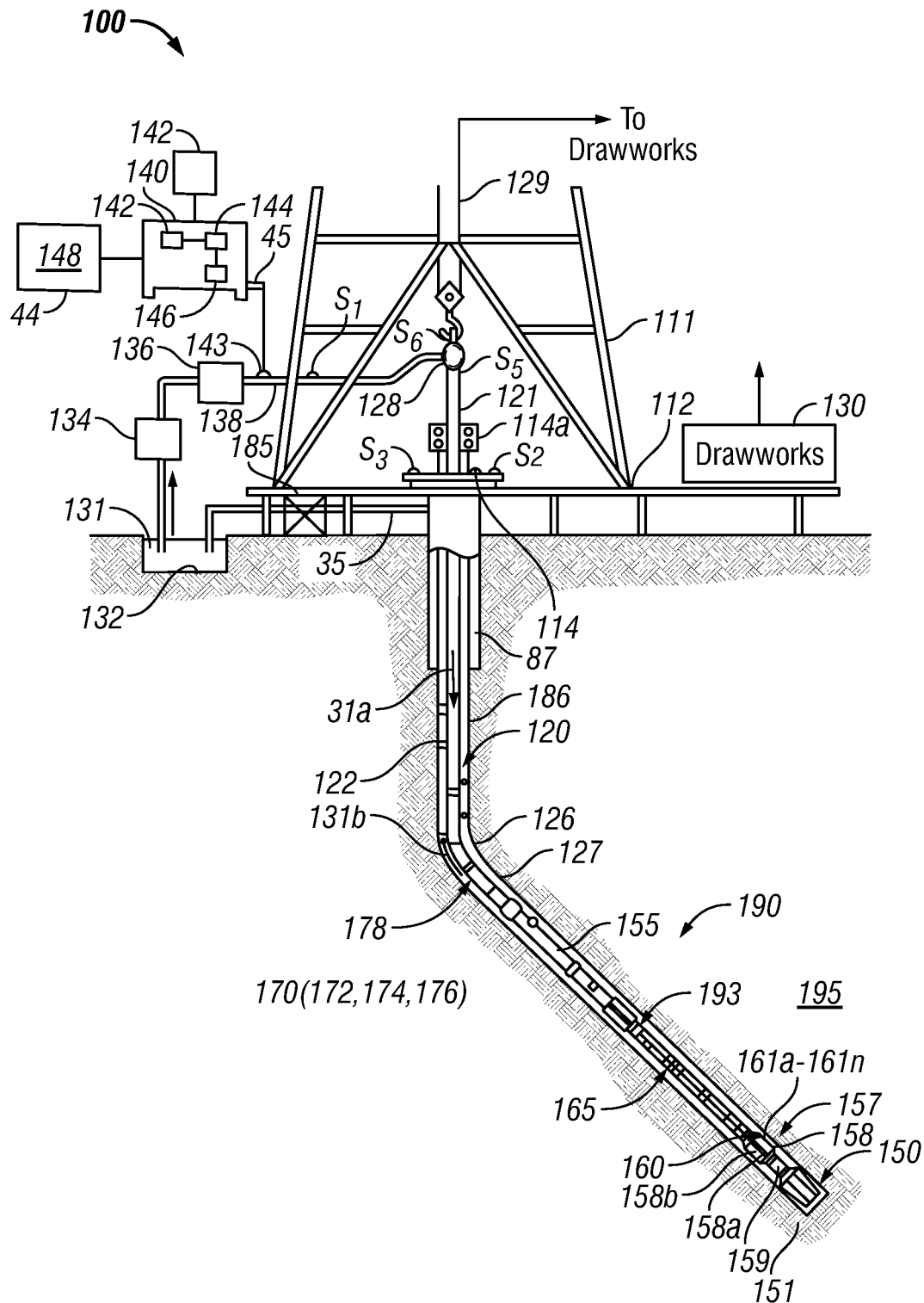
FIG. 1 is an elevation view of an exemplary drilling system suitable for use with the present disclosure.

FIG. 1 is a schematic diagram of an exemplary drilling system 100 that includes a drill string having a drilling assembly attached to its bottom end that includes a steering unit according to one embodiment of the disclosure. FIG. 1 shows a drill string 120 that includes a drilling assembly or bottomhole assembly (BHA) 190 conveyed in a borehole 126. The drilling system 100 includes a conventional derrick 111 erected on a platform or floor 112 which supports a rotary table 114 that is rotated by a prime mover, such as an electric motor (not shown), at a desired rotational speed. A tubing (such as jointed drill pipe) 122, having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a de-surger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. A surface torque sensor $S_2$ and a sensor $S_3$ associated with the drill string 120 respectively provide information about the torque and the rotational speed of the drill string 120. Tubing injection speed is determined from the sensor $S_5$, while the sensor $S_6$ provides the hook load of the drill string 120.

In some applications, the drill bit 150 is rotated by only rotating the drill pipe 122. However, in many other applications, a downhole motor 155 (mud motor) disposed in the drilling assembly 190 also rotates the drill bit 150. The ROP for a given BHA largely depends on the WOB or the thrust force on the drill bit 150 and its rotational speed.

The mud motor 155 is coupled to the drill bit 150 via a drive shaft disposed in a bearing assembly 157. The mud motor 155 rotates the drill bit 150 when the drilling fluid 131 passes through the mud motor 155 under pressure. The bearing assembly 157, in one aspect, supports the radial and axial forces of the drill bit 150, the down-thrust of the mud motor 155 and the reactive upward loading from the applied weight-on-bit.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided to the surface control unit 140. The surface control unit 140 displays desired drilling parameters and other information on a display/monitor 142 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices.

The BHA may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the drilling assembly 190. Such sensors are generally known in the art and for convenience are generally denoted herein by numeral 165. The drilling assembly 190 may further include a variety of other sensors and devices 159 for determining one or more properties of the BHA (such as vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.) For convenience, all such sensors are denoted by numeral 159.

The drilling assembly 190 includes a steering apparatus or tool 158 for steering the drill bit 150 along a desired drilling path. In one aspect, the steering apparatus may include a steering unit 160, having a number of force application members 161a-161n, wherein the steering unit is at partially integrated into the drilling motor. In another embodiment the steering apparatus may include a steering unit 158 having a bent sub and a first steering device 158a to orient the bent sub in the wellbore and the second steering device 158b to maintain the bent sub along a selected drilling direction.

The MWD system may include sensors for measuring environmental variables such as borehole size, tool standoff, formation mineralogy, and salinity of the formation fluid, and a processor configured to use the environmental measurements together with measurements made by a neutron porosity sensor, to provide an estimate of formation porosity. U.S. Pat. No. 7,548,817 to Hassan et al., having the same assignee as the present disclosure and the contents of which are incorporated herein by reference, discloses a method and apparatus for formation evaluation using the estimated borehole tool position. Caliper measurements made during rotation of a bottomhole assembly are processed to estimate the location of the BHA, and size and shape of the borehole. A piecewise elliptical fitting procedure may be used. These estimates may be used to correct measurements made by a standoff-sensitive formation evaluation sensor such as a neutron porosity tool. U.S. Pat. No. 7,205,535 to Madigan et al., having the same assignee as the present application and the contents of which are incorporated herein by reference, discloses making and elemental analysis of an earth formation using measurements from a pulsed neutron logging tool. The elemental analysis may be made by applying a fitting procedure using known elemental spectra to measured spectra made by a pulsed neutron logging tool and natural gamma ray measurements. From the elemental analysis, an estimate of the mineralogy of the formation is made treating the problem as one of Linear Programming (maximizing an objective function subject to equality and/or inequality constraints). Formation salinity may be estimated using resistivity measurements and/or by sampling the formation fluid.

Figure 2:
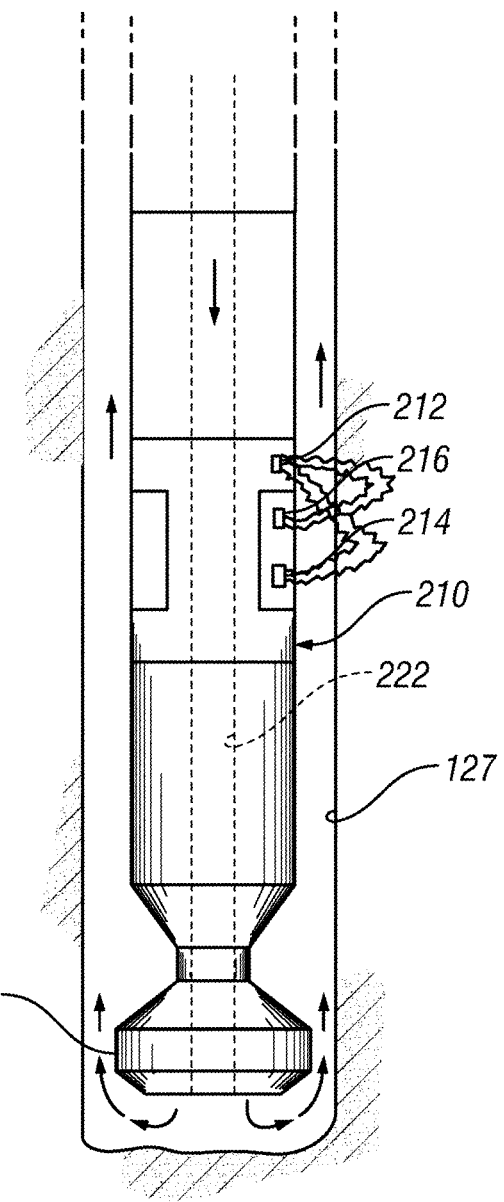
FIG. 2 is a side elevation view, partly in cross section, of the nuclear logging tool in accordance with the present invention.

Referring to FIG. 2, a diagram of the basic components for a neutron porosity tool 210 in accordance with the present disclosure is shown. This tool comprises a drill collar which contains a neutron source 212 and two spaced neutron detector assemblies 214 and 216. All three components are placed eccentrically so that they are close to the formation. The detector closest to the neutron source will be referred to as the "near detector" and the one furthest away is referred to as the "far detector".

As discussed in U.S. Pat. No. 5,278,758 to Perry et al., having the same assignee as the present disclosure and the contents of which are incorporated herein by reference, the tool 210 is placed into service by loading it with a sealed chemical source (typically a 5 Curie Americium Beryllium) and lowering it into a formation. Fast neutrons (approximate average 4.4 MeV) are continuously emitted by the source and these propagate out into the formation. The fast neutrons interact with the formation and are slowed down (thermalized) by hydrogen that is present in the environment surrounding the tool.

Most of the neutrons that are emitted by the source are thermalized and absorbed by the formation surrounding the tool. Some of the remaining thermal neutrons will then get counted by either the near or far detectors and contribute to the data collected by the tool.

Calibration of the tool is accomplished by the use of laboratory formations. These specially built formations allow the tool response to be characterized for various porosities, borehole size and lithologies. In any given laboratory formation the basic measurement that is taken from the tool is the ratio. The ratio is computed by dividing the near count rate by the far count rate. After the ratio has been characterized, in all of the laboratory formations, it is possible to generate calibration curves. These calibration curves translate the tools ratio into the porosity of a formation being logged.

Figure 3A:
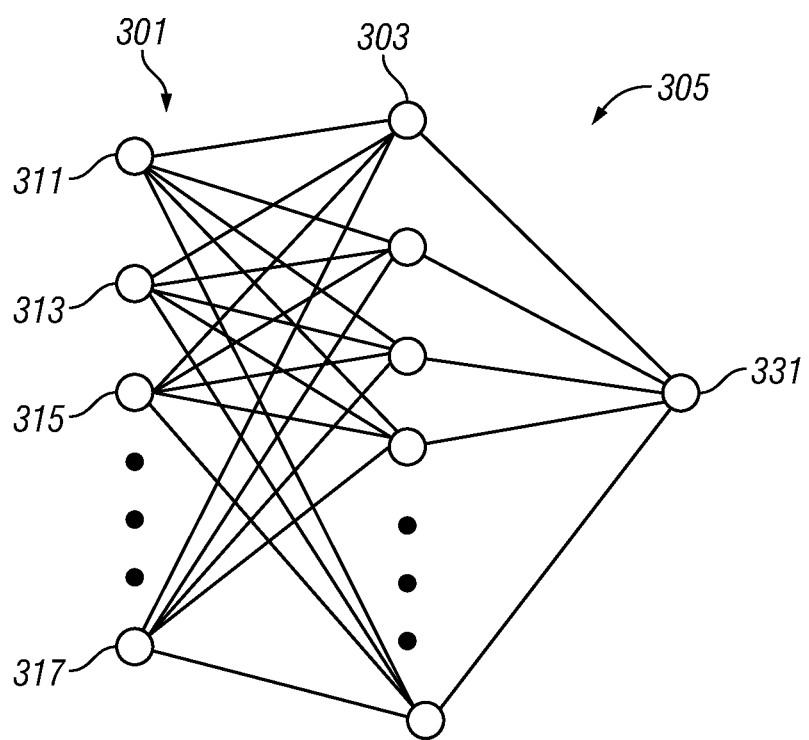
FIG. 3a shows a Neural Network (NN) for estimation of formation porosity according to a first embodiment of the present disclosure.
Figure 3B:
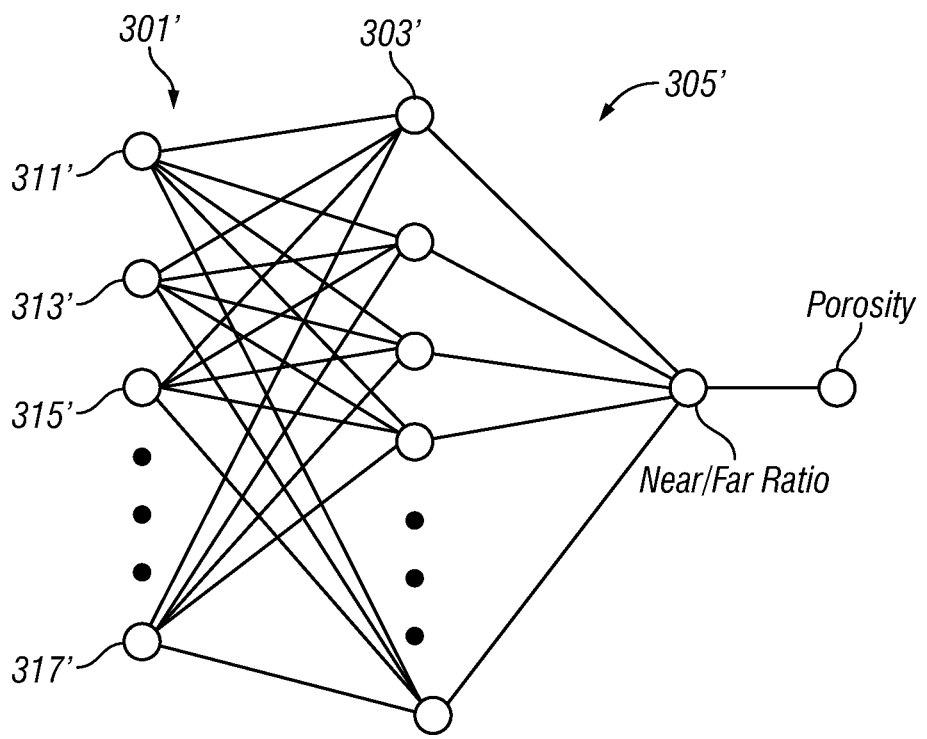
FIG. 3b shows a NN for estimation of formation porosity according to a second embodiment of the present disclosure.
Figure 4:
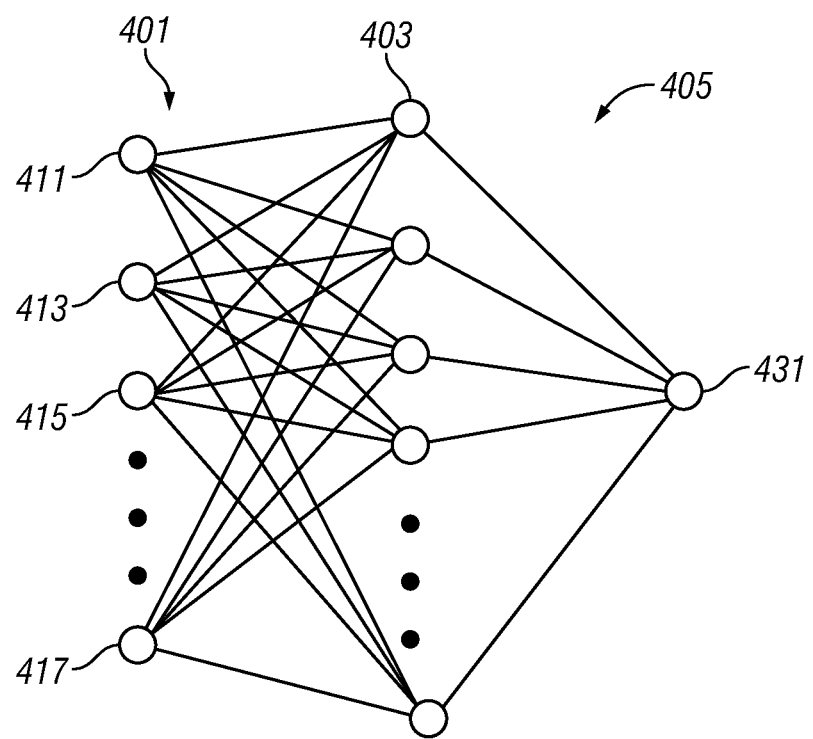
FIG. 4 shows a NN for estimation of formation density according to a third embodiment of the present disclosure.

Methods to illustrate the estimation of formation porosity are shown in FIGS. 3 and 4. Shown in FIG. 3 is a Neural Net having a single hidden layer 303. The input layer 301 includes a number of processors depicted by 311, 313, 315 and 317. The input to the input layer may include measurements such as the near/far ratio of the neutron porosity tool, the size of the borehole, the standoff of the tool from the borehole wall, formation mineralogy, salinity of the borehole fluid, salinity of the formation fluid, density of the borehole fluid, temperature of the borehole fluid, temperature of the formation, pressure of the borehole fluid, formation pore pressure, etc. The list is not intended to be complete and, as noted above, some of the measurements may be made during the drilling process while other measurements may be a priori from knowledge of the subsurface or from previously drilled boreholes. The hidden layer 303 includes a plurality of processors and the output layer in this example has a single processor.

In the example shown, the processor of the output layer 305 provides a weighted combination of the outputs of each of the outputs of the processors of the hidden layer 305. The output of each of the processors in hidden layer is a weighted combination of each of the outputs of the processors 311, 313, 315 . . . 317 of the input layer which may be the measurements or may be a function of the measurements.

The training of the NN comprises providing a set of input values (defined as a sample) to the input layer. The output 331 of the output layer 305 is compared to known value of porosity corresponding to the set of input values for the sample. In the training phase, this is done for a set of samples called the "training set" and the weights at each of the processors is adjusted to improve a match between the outputs 331 and the known porosity value for each set of input values in the training set. The training process is terminated when convergence is reached. Convergence may be determined when the incremental change in the weights very small, or after a given number of samples have been processed.

Following the training phase, the weights are kept fixed and a plurality of samples called the "test set" are processed using the NN with the fixed weights. If good agreement is noted between predicted and actual porosities in the test set, then the NN is considered to be trained, and the NN is installed in the processor of the BHA or data processing system on the surface for use during drilling operations. If good agreement is not noted in the test set between the NN output and the actual porosity, then further training is carried out.

Turning now to FIG. 3b, another embodiment of the disclosure for estimation of formation porosity is shown. As in FIG. 3a, an input layer 301', a hidden layer 303' and an output layer 305' are shown, along with inputs 311', 313', 315' . . . 317'. The difference lies in that the output of the output layer is an estimated Near/Far ratio for the porosity tool, so that training is provided to match the output of the output layer 305' to the Near/Far ratio. Once the NN has been trained and tested, in the application of the NN, the porosity is estimated from the output Near/Far ratio of the NN.

It should be noted that the method of the present disclosure is not limited to the example shown. The method is also applicable using a variety of environmental variables such as standoff, borehole size, mud weight, temperature, pressure, borehole salinity. More than one hidden layer can be used. The output can be porosity, counting rates at detectors, or corrected near-to-far ratio from which porosity can be estimated. The method can be used for thermal neutron porosity measurements as well as epithermal porosity measurements. The number of detectors is not limited to two. The method can be used in both wireline and logging while drilling environments. The method can also used in estimating formation density. This is discussed next with respect to FIG. 4.

FIG. 4, shows an embodiment of the disclosure for estimation of formation density. As in FIG. 3a, an input layer 401a hidden layer 403 and an output layer 405 are shown, along with inputs 411, 413, 415 . . . 317'. A difference is that the output of the output layer is an estimated density for a density tool, and the input to the input layer includes a source-normalized near detector count rate, and source-normalized far detector count rate, standoff, and borehole size.

Once values of the porosity or density of the formation have been estimated, these estimated values may be used for further operations. These further operations may include further logging operations in the borehole, testing of selected zones in the borehole to evaluate reservoir properties, selection of zones in the borehole for completion and production operations, and selection of sites for drilling additional boreholes.

The processing of the measurements may be done using processors including computer-readable media. The individual computer-readable media may include (i) a ROM, (ii) an EPROM, (iii) an EAROM, (iv) an EEPROMs, (v) a flash memory, (vi) a RAM, (vii) a hard drive, or (viii) an optical disk.

What is claimed is:

1. A method of evaluating an earth formation, the method comprising:
   using a neutron porosity tool conveyed in a borehole for making a measurement indicative of a porosity of the earth formation, the neutron porosity tool having a plurality of detectors;
   using at least one additional sensor for making at least one additional measurement indicative of at least one environmental factor affecting the measurement made by the sensor;
   using a trained neural network (NN) in the tool for estimating a value of the porosity of the formation in real time while drilling by simultaneously using the measurement and the at least one additional measurement as a set of input values; and
   performing further operations using the estimated value of the porosity, wherein estimating the value of the porosity further comprises estimating a ratio between a measurement made by a first one of the plurality of detectors and a second one of the plurality of detectors.

2. The method of claim 1 wherein estimating the value of the porosity further comprises using the NN to estimate a ratio between a measurement made by a first one of the plurality of detectors and a second one of the plurality of detectors.

3. The method of claim 1 wherein the at least one environmental factor affecting the measurement made by the sensor is selected from: (i) a borehole size, (ii) a tool standoff, (iii) a formation mineralogy, (iv) a salinity of the borehole fluid, (v) a salinity of the formation fluid, (vi) a density of the borehole fluid, (vii) a temperature of the borehole fluid, (viii) a temperature of the formation, (ix) a pressure of the borehole fluid, or (x) a pressure in the formation.

4. The method of claim 1 wherein the measurement and the at least one additional measurement are input to an input layer of the NN and the estimated value of the porosity is an output of an output layer of the NN.

5. The method of claim 1 further comprising disposing the sensor and the at least one additional sensor on a tool conveyed in a borehole using a conveyance device selected from: (i) a drilling tubular, or (ii) a wireline.

6. An apparatus configured to evaluate an earth formation, the apparatus comprising:
- a neutron porosity tool configured to be conveyed in a borehole and make a measurement indicative of a porosity of the earth formation, the neutron porosity tool having a plurality of detectors;
- at least one additional sensor configured to make at least one additional measurement indicative of at least one environmental factor affecting the measurement made by the sensor;
- a trained neural net (NN) in the tool configured to estimate a value of the porosity of the formation in real time while drilling by simultaneously using the measurement and the at least one additional measurement as a set of input values; and
- a processor configured to perform further operations using the estimated value of the porosity, wherein estimating the value of the porosity further comprises estimating a ratio between a measurement made by a first one of the plurality of detectors and a second one of the plurality of detectors.

7. The apparatus of claim 6 wherein the NN is further configured to estimate a ratio between a measurement made by a first one of the plurality of detectors and a second one of the plurality of detectors.

8. The apparatus of claim 6 wherein the at least one additional sensor is configured to measure environmental factors selected from: (i) a borehole size, (ii) a tool standoff, (iii) a formation mineralogy, (iv) a salinity of the borehole fluid, (v) a salinity of the formation fluid, (vi) a density of the borehole fluid, (vii) a temperature of the borehole fluid, (viii) a temperature of the formation, (ix) a pressure of the borehole fluid, or (x) a pressure in the formation.

9. The apparatus of claim 6 wherein the measurement and the at least one additional measurement are input to an input layer of the NN and the estimated value of the porosity is an output of an output layer of the NN.

10. The apparatus of claim 6 wherein the sensor and the at least one additional sensor are disposed on a tool conveyed in a borehole using a conveyance device selected from: (i) a drilling tubular, or (ii) a wireline.

11. A method of evaluating an earth formation, the method comprising:
- using a gamma ray density tool having a plurality of detectors conveyed in a borehole for making a measurement indicative of a density of the earth formation;
- using at least one additional sensor for making at least one additional measurement indicative of at least one environmental factor affecting the measurement made by the gamma ray density tool;
- using a trained neural network (NN) in the tool for estimating a value of the density of the formation in real time while drilling by simultaneously using the measurement and the at least one additional measurement as a set of input values; and
- performing further operations relating to the earth formation using the estimated value of the property.

12. An apparatus configured to evaluate an earth formation, the apparatus comprising:
- a gamma ray density tool configured to be conveyed in a borehole and make a measurement indicative of a density of the earth formation, the neutron porosity tool having a plurality of detectors;
- at least one additional sensor configured to make at least one additional measurement indicative of at least one environmental factor affecting the measurement made by the sensor;
- a trained neural net (NN) in the tool configured to estimate a value of the density of the formation in real time while drilling by simultaneously using the measurement and the at least one additional measurement as a set of input values; and
- a processor configured to perform further operations relating to the earth formation using the estimated value of the density.

13. The method of claim 1 wherein the neural network has an output of at least one of: i) porosity, ii) a counting rate at at least one detector, iii) and a corrected near-to-far ratio indicative of porosity.

14. The method of claim 11 wherein further operations comprise at least one of: i) further logging operations in the borehole, ii) testing of selected zones in the borehole to evaluate reservoir properties, iii) selection of zones in the borehole for completion, iv) production operations, and v) selection of sites for drilling additional boreholes.

15. The apparatus of claim 12 wherein further operations comprise at least one of: i) further logging operations in the borehole, ii) testing of selected zones in the borehole to evaluate reservoir properties, iii) selection of zones in the borehole for completion, iv) production operations, and v) selection of sites for drilling additional boreholes.

* * * * *